W. F. Goodwin,

Churn.

No. 101,856.    Patented Apr. 12, 1870.

Witnesses
Alex Mahon
H. A. Doubleday

Wm. F. Goodwin
by his attorney
A. M. Smith

United States Patent Office.

WILLIAM F. GOODWIN, OF METUCHEN, NEW JERSEY.

Letters Patent No. 101,856, dated April 12, 1870.

IMPROVEMENT IN CHURNS.

The Schedule referred to in these Letters Patent and making part of the same

*To all whom it may concern:*

Be it known that I, WILLIAM F. GOODWIN, of Metuchen, county of Middlesex, State of New Jersey, have invented certain new and useful Improvements in Churns, of which the following is a full, clear, and exact description, reference being had to the accompanying drawings making a part of this specification, in which—

Similar letters of reference denote corresponding parts in both figures.

Figure 1:
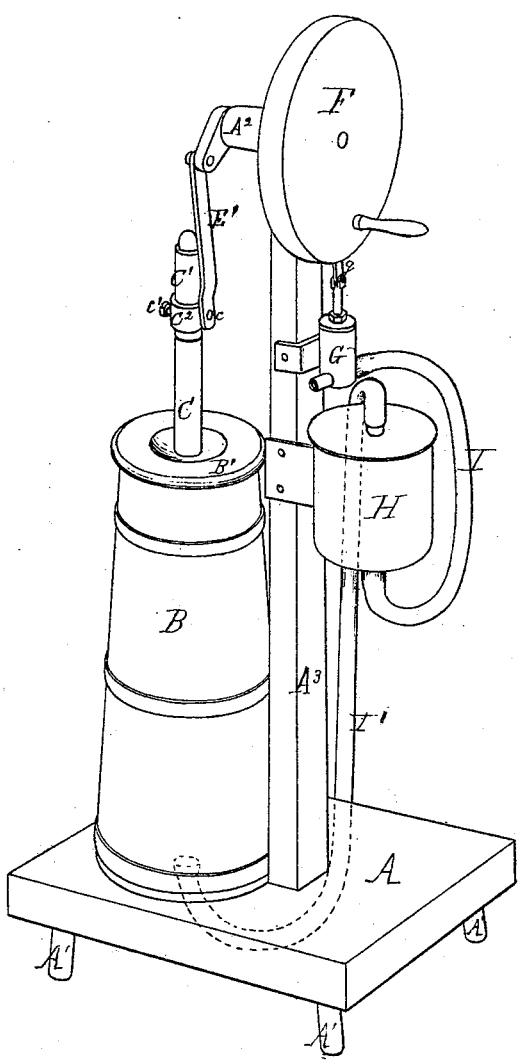
Figure 1 is a perspective view of my churn.

In the construction of a churn the following facts should be kept in view.

First, that the portion of the milk out of which butter is made is contained in minute cells, pods, or sacks, arranged in groups, each group or cluster being in turned incased by another shell, which also incloses a small quantity of water, whey, or other substance.

Second, that when this outer shell is broken and removed and the inner sacks or particles of butter are brought into contact with each other they cohere, and only need to be freed from butter-milk in order to make a perfect article of butter.

A third fact to be noticed in this connection is that when, from any cause, these inner cells or sacks get broken, thereby releasing the oil contained therein, it injures the grain of the butter, making it oily and salvy, from which condition it cannot be restored, as is fully shown in the case of butter which has been once melted, where the grain is entirely destroyed.

Now it is obvious, in view of the foregoing facts, that a churn that shall churn all the milk sufficiently, and none of it too much, must agitate the entire mass thoroughly and uniformly, dividing it into small portions and keeping them constantly in motion, so that the friction between the little globules shall be just sufficient to remove the shells from all of them without injuring the butter-sacks.

It is often found necessary to change the temperature of the milk or cream while churning. This should be done without unduly heating or cooling any portion of it, and to accomplish these ends expeditiously and effectually I have invented the following described improved churn.

The nature of this improvement will be fully understood from the following description of its construction and operation.

In the drawings—

A is a platform represented as being supported upon legs $A^1$.

$A^3$ is a vertical post fixed rigidly in said platform.

B is a churn of the form ordinarily denominated the "barrel churn."

$B^1$ is the cover of the churn, provided with a perforation in the center, through which passes the dasher-rod C.

$B^2$ is a spiral twist or worm-shaft or track, secured in an upright position upon the bottom of the churn, on a line coincident with the axial center of said churn. I make this spiral twist $B^2$ of metal, and finish it smoothly, in order to avoid friction, as will be hereinafter explained.

The dasher is composed of two circular heads or disks $D\ D^1$, each perforated or slotted similarly to the dasher in common use. These heads are of such size as to fit the inside of the churn as closely as may be found advisable.

Figure 2:
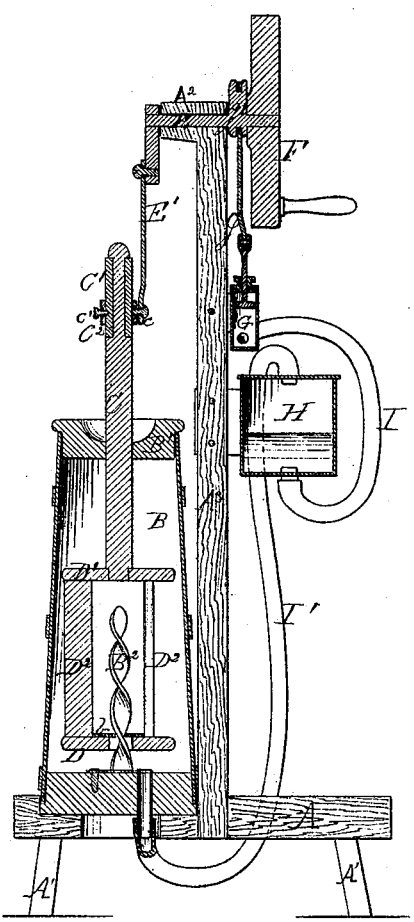
Figure 2 is a vertical section of the same.

$D^2\ D^2$ are wings or vanes connecting heads $D\ D^1$. The distance between these heads is not essential, but I prefer to make the dasher about one-half the length of the churn, and the vanes should stand on lines radial to the centers of the heads, as shown in fig. 2.

$b$ is a metallic plate attached to one side of disk D. This plate is slotted so as to fit and slide upon the spiral twist.

$C^1$ is a sleeve surrounding the upper end of rod C, and secured thereto by any suitable means whereby said rod may be permitted to rotate freely within sleeve $C^1$.

$C^2$ is a collar, provided with a spur or wrist, $c$, and adjusted upon sleeve $C^1$ by means of set-screw $c'$, or equivalent device.

The standard $A^3$ is expanded at its upper end so as to form a tubular bearing, $A^2$, in which is mounted a crank-shaft, E, connected with rod C through pitman $E'$.

F is a band-wheel or pulley keyed rigidly to crank-shaft E.

G is an air-pump, operated by means of pitman $g$ and eccentric $g'$ on shaft E.

H is a hot-water reservoir or heater.

I is a pipe leading from air-pump G to the bottom of the heater.

$I'$ is a pipe leading from the top of the heater to the bottom of the churn, with the interior of which it communicates in any desired or convenient manner.

The operation of my churn is as follows:

In setting it up the dasher should be so adjusted that it will at each stroke reach the bottom as nearly as may be practicable, such adjustment being effected by the collar $C^2$. After the milk or cream has been introduced a reciprocating motion is given to the dasher-rod C by the pitman $E'$, and, as the dasher moves up and down upon the spiral twist $B^2$, it (the dasher) receives a rotary motion which, with its direct reciprocating motion, will thoroughly agitate the entire mass of milk or cream. At the same time I force a stream of air in through the bottom of the churn by means of air-pump G.

The drawing represents such an arrangement as requires the air to pass through heating-chamber H. This chamber is designed to be partially filled with either hot or cold water, as may be required, and, as the air is forced in at the bottom and passes up through the water, it is either heated or cooled by it, as the case may be, and the air in turn effects the temperature of the milk in the churn, through which it is forced immediately after leaving chamber H. The introduction of air in this manner assists materially in the agitation of the milk, and after the butter appears the dasher may be withdrawn, and the butter collected in a mass by the ebullition produced by the stream of air coming in at the bottom. A convenient method of removing the butter from the churn is by drawing off the milk, either through pipe I' or through the aperture at the bottom of the churn, and afterward taking out the butter with a ladle or by turning the churn bottom upward.

Among the advantages possessed by my churn are the following:

First, the uniformity with which the friction or agitation of the particles of milk is maintained throughout the entire mass, breaking the shells of all the globules as nearly at the same time as possible, and, of course, injuring little or none of the butter by undue friction.

Second, the ease and certainty with which the temperature of the milk may be changed without any portion of it becoming over-heated.

Having now described my invention,

What I claim as new, and desire to secure by Letters Patent, is—

1. The spiral twist or track $B^2$, rigidly attached to the bottom of the churn, in combination with the churn-dasher, substantially as set forth.

2. In combination with a churn a heating or cooling-chamber arranged outside of the body of the churn, and a connecting-pipe which discharges the air into the churn at or near the bottom, substantially as set forth.

3. The combination of a device adapted to introduce air into a churn at or near the bottom, and a dasher to assist in agitating the cream, substantially as set forth.

WM. F. GOODWIN.

Witnesses:
ALEX. MAHON,
H. H. DOUBLEDAY.